(12) United States Patent
Jin et al.

(10) Patent No.: US 12,153,301 B2
(45) Date of Patent: Nov. 26, 2024

(54) DISPLAY PANEL AND MANUFACTURING METHOD THEREOF

(71) Applicant: Shanghai AVIC Optoelectronics Co., Ltd., Shanghai (CN)

(72) Inventors: Huijun Jin, Shanghai (CN); Jian Zhao, Shanghai (CN); Anran Song, Shanghai (CN); Tenggang Lou, Shanghai (CN)

(73) Assignee: Shanghai AVIC Optoelectronics Co., Ltd., Shanghai (CN)

( * ) Notice: Subject to any disclaimer, the term of this patent is extended or adjusted under 35 U.S.C. 154(b) by 0 days.

(21) Appl. No.: 18/206,147

(22) Filed: Jun. 6, 2023

(65) Prior Publication Data
US 2023/0314859 A1    Oct. 5, 2023

(30) Foreign Application Priority Data

Feb. 24, 2023 (CN) .......................... 202310167001.4

(51) Int. Cl.
*G02F 1/1333* (2006.01)
*G02F 1/1335* (2006.01)
*G02F 1/1343* (2006.01)

(52) U.S. Cl.
CPC .. *G02F 1/133382* (2013.01); *G02F 1/133512* (2013.01); *G02F 1/134309* (2013.01)

(58) Field of Classification Search
CPC ......... G02F 1/133382; G02F 1/133512; G02F 1/134309; G02F 1/136286; G02F 1/134372; G02F 1/133; G02F 1/1333
See application file for complete search history.

(56) References Cited

U.S. PATENT DOCUMENTS

2020/0201109 A1*   6/2020  Zhao ................. G02F 1/133382

* cited by examiner

*Primary Examiner* — Mariam Qureshi
(74) *Attorney, Agent, or Firm* — KDW Firm PLLC

(57) ABSTRACT

Provided are a display panel and a manufacturing method thereof. The display panel includes a base material and a first metal layer and a second metal layer which are laminated on the base material in a thickness direction of the display panel. The first metal layer includes first metal lines, the second metal layer includes second metal lines, the first metal lines extend in a first direction, and the second metal lines extend in a second direction, the first direction intersects the second direction. The first metal layer or the second metal layer includes third metal lines, a third metal line includes at least two first segments extending in the first direction and at least two second segments extending in the second direction, and two adjacent first segments are connected by one second segment. The display panel further includes a heating control assembly electrically connected to the third metal lines.

23 Claims, 10 Drawing Sheets

DISPLAY PANEL AND MANUFACTURING METHOD THEREOF

CROSS-REFERENCE TO RELATED APPLICATIONS

This application claims the priority to Chinese Patent Application No. 202310167001.4 filed on Feb. 24, 2023, the disclosure of which is incorporated herein by reference in its entirety.

TECHNICAL FIELD

The present disclosure relates to the technical field of display panels and, in particular, to a display panel and a manufacturing method thereof.

BACKGROUND

In the existing technical field of display panels, there is a lack of an effective panel heating scheme. As a result, in a low-temperature environment, the performance of the display panel may be affected due to slowed response speed of liquid crystals. If a heating device is added outside the display panel, on the one hand, the heat conduction effect is not ideal, and it is difficult to achieve uniform heating on the whole display panel: on the other hand, more heat will be transferred to other parts of the display device, affecting the heat dissipation performance of the part that does not need to be heated.

To solve this problem, transparent conductive materials such as indium tin oxide (ITO) are used in some products to make heating wires arranged in the display panel: however, since common electrodes and pixel electrodes in the display panel are also made of indium tin oxide and are arranged in a large number in the display panel, an additional layer of indium tin oxide and an insulating layer needs to be disposed to avoid the short circuit caused by overlapping between the heating wires and the common electrodes or the pixel electrodes, increasing the costs and the thickness.

Moreover, since an individual indium tin oxide film layer needs to be made, and this film layer needs to be patterned to satisfy the requirements of uniform heating in a panel or heating in a specific region, an additional mask needs to be added to the process, and an additional exposure procedure needs to be added, resulting in complicated procedures and increasing costs.

SUMMARY

In view of this, embodiments of the present disclosure provide a display panel and a manufacturing method thereof, which solve the problem in the prior art that the provision of a heating film layer results in an increased thickness, a complicated manufacturing process and high costs.

An embodiment of the present disclosure provides a display pane. The display panel includes a base material and a first metal layer and a second metal layer which are laminated on the base material in a thickness direction of the display panel, where the first metal layer includes first metal lines, the second metal layer includes second metal lines, the first metal lines extend in a first direction, and the second metal lines extend in a second direction: the display panel further includes a first region and a second region surrounding the first region, and in the first region, the first direction intersects the second direction.

At least one of the first metal layer or the second metal layer includes third metal lines, a third metal line includes at least two first segments extending in the first direction and at least two second segments extending in the second direction, and two adjacent first segments are connected by one second segment.

The display panel further includes a light-shielding layer, the third metal lines and the light-shielding layer are laminated in the thickness direction of the display panel, and the light-shielding layer at least partially overlaps the third metal lines.

The display panel further includes a heating control assembly, and the third metal lines are electrically connected to the heating control assembly.

An embodiment of the present disclosure further provides a method for manufacturing a display panel, and the method includes steps described below. A base material is provided: a first metal layer is formed on the base material, and first metal lines and third metal lines are formed by a patterning process: a first insulating layer is prepared on the first metal layer; and a second metal layer is formed on the first insulating layer, and second metal lines are formed by a patterning process.

An embodiment of the present disclosure further provides a method for manufacturing a display panel, and the method includes steps described below. A base material is provided: a first metal layer is formed on the base material, and first metal lines are formed by a patterning process: a first insulating layer is prepared on the first metal layer; and a second metal layer is formed on the first insulating layer, and second metal lines and third metal lines are formed by a patterning process.

Compared with the related art, a display panel and a manufacture method thereof provided in the embodiments of the present disclosure have technical effects described below.

The third metal lines are disposed in any one of the first metal layer and the second metal layer, and the third metal lines are electrically connected to a heating control assembly, so that the heating of the entire panel is achieved through the third metal lines without the need of disposing an additional thin film of indium tin oxide or other film layers, and the thickness of the panel is reduced compared with the existing art. Moreover, at least one of the alignment of the third metal lines and lines in the first metal layer, the alignment of the third metal lines and lines in the first metal layer, or the alignment of the third metal lines and the lines in the first metal layer and lines in the second metal layer, may be made by the same patterning procedure, so that the overall process is simplified and costs are reduced. A third metal line includes first segments extending in the first direction and second segments extending in the second direction, and this bending form improves the heating uniformity within the panel.

BRIEF DESCRIPTION OF DRAWINGS

To illustrate the technical solutions in embodiments of the present disclosure or technical solutions in the related art more clearly, drawings used in the description of the embodiments or the related art will be briefly described below. Apparently, the drawings described below are merely embodiments of the present disclosure, and those skilled in the art may obtain other drawings based on the provided drawings on the premise that no creative work is done.

Figure 1:
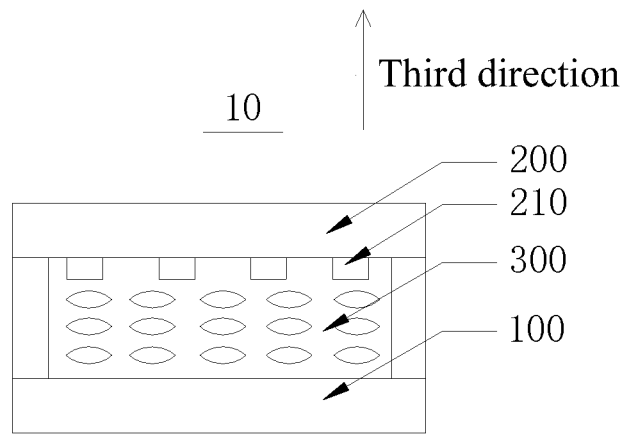
FIG. 1 is a structural diagram of a display panel according to an embodiment of the present disclosure.

REFERENCE LIST 10 display panel
100 first substrate
110 first metal layer
111 first metal lines
112 third metal lines
1121 first segment
1122 second segment
1123 third segment
11231 first section
11232 second section
113 first electrode
120 second metal layer
121 second metal lines
122 second electrode
123 third electrode
1231 first portion
1232 second portion
124 third metal lines
1241 first segment
1242 second segment
130 semiconductor layer
131 semiconductor region
1311 first semiconductor block
1312 third semiconductor block
1313 second semiconductor block
140 first transparent electrode layer
150 first insulating layer
160 second insulating layer
170 second transparent electrode layer
180 first subpixel
190 second subpixel
200 second substrate
210 light-shielding layer
221 blue color resistor
222 green color resistor
223 red color resistor
300 liquid crystal layer
400 display control assembly
500 heating control assembly
600 first region
700 second region

DETAILED DESCRIPTION

To illustrate the purpose, technical solutions and advantages of embodiments of the present disclosure more clearly, the technical solutions of the embodiments of the present disclosure will be described clearly and completely in conjunction with drawings. Apparently, the embodiments described below are part, not all, of embodiments of the present disclosure. Based on the embodiments of the present disclosure, all other embodiments acquired by those of ordinary skill in the art are within the scope of the present disclosure on the premise that no creative work is done.

Terms used in the embodiments of the present disclosure are intended only to describe the specific embodiments and not to limit the present disclosure. As used in the embodiments of the present disclosure and the appended claims, the singular forms, including "a", "an" and "the", are intended to include the plural forms as well, unless the context clearly indicates otherwise.

Figure 2:
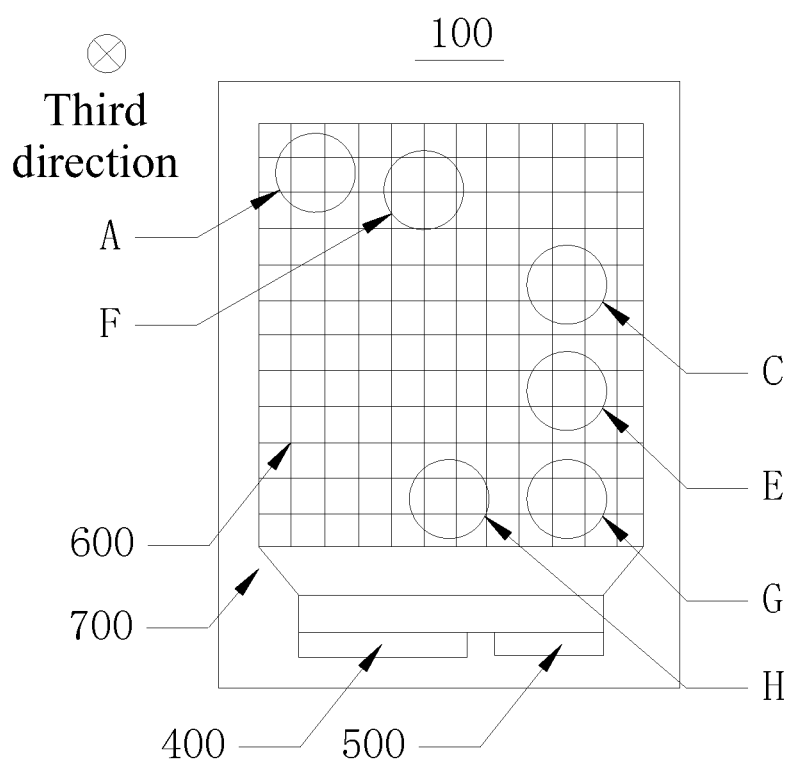
FIG. 2 is a structural diagram of a first substrate according to an embodiment of the present disclosure.
Figure 3:
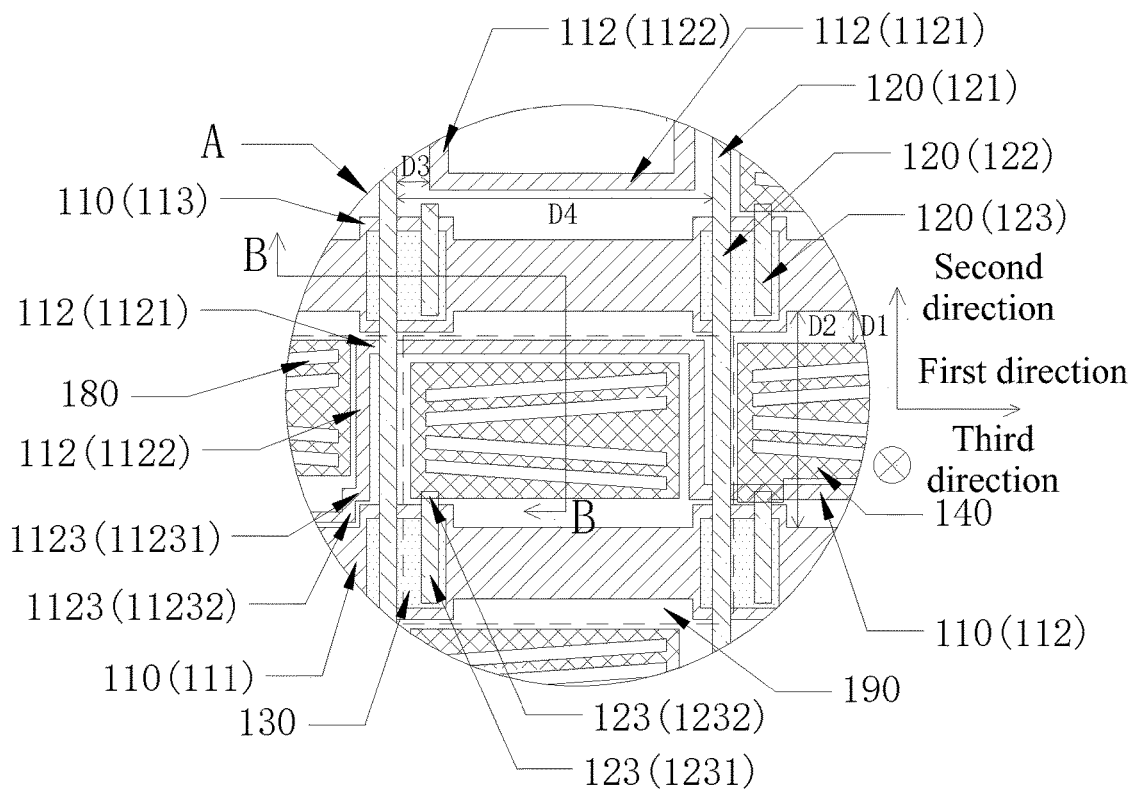
FIG. 3 is a partial enlarged diagram of region A in FIG. 2.

FIG. 1 is a structural diagram of a display panel 10 according to an embodiment of the present disclosure, FIG. 2 is a structural diagram of a first substrate 100 according to an embodiment of the present disclosure, and FIG. 3 is a partial enlarged diagram of region A in FIG. 2. Reference is made to FIGS. 1 to 3. The display panel 10 includes a liquid crystal layer 300, a first substrate 100 and a second substrate 200. The first substrate 100, the liquid crystal layer 300 and the second substrate 200 are sequentially laminated in a third direction, and the third direction is a thickness direction of the display panel 10. Electrodes are disposed on the first substrate 100, and an electric field formed by the electrodes on the first substrate 100 controls the rotation of liquid crystal molecules in the liquid crystal layer 300 so that the basic display function of the display panel 10 is achieved.

It is to be understood that in other optional embodiments, electrodes may be disposed on the first substrate 100 and the second substrate 200 respectively so that an electric field is formed between the first substrate 100 and the second substrate 200 and thus the basic display function of the display pane 10 is achieved.

Figure 4:
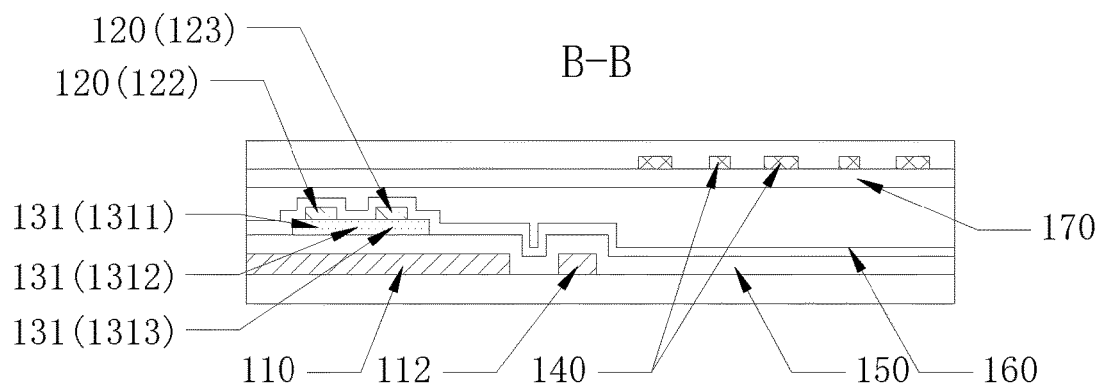
FIG. 4 is a sectional diagram taken along direction B-B in FIG. 3.

FIG. 4 is a sectional diagram taken along direction B-B in FIG. 3. Reference is made to FIGS. 1 to 4. In the embodiment, the display panel 100 includes a base material and a first metal layer 110, a first insulating layer 150, a semiconductor layer 130, a second metal layer 120, a second insulating layer 160, a second transparent electrode layer 170, a third insulating layer (not shown in the figure), a first transparent layer 140 and an alignment layer (not shown in the figure) which are laminated on the base material in the thickness direction of the display panel 10. The second metal layer 120 is partially electrically connected to the first transparent electrode layer 140 and partially electrically connected to the second transparent electrode layer 170, and the second metal layer 120 is connected to the semiconductor layer 130: the first metal layer 110 controls the working state of the first transparent electrode layer 140 and the working state of the second transparent electrode layer 170 by controlling the conduction state of the semiconductor layer 130; and an electric field is formed between the first substrate 100 and the second substrate 200 by the cooperation of the first transparent electrode layer 140 and the second transparent electrode layer 170 to control the rotation of liquid crystal molecules in the liquid crystal layer 300.

It is to be noted that the second transparent electrode layer 170 and part of the first transparent electrode layer 140 are not shown in FIG. 3, which does not mean that no second transparent electrode and no first transparent electrode exist at corresponding positions, but other structures in the figure are more clearly shown.

It is to be understood that in other optional embodiments, the first transparent electrode layer 140 and the second transparent electrode layer 170 may also be powered by other metal layers.

It is to be noted that in the embodiment, the first metal layer 110 includes first metal lines 111, the second metal layer 120 includes second metal lines 121, the first metal lines 111 extend in a first direction, and the second metal lines 121 extend in a second direction. The display panel 10 further includes a first region 600 and a second region 700 surrounding the first region 600, and in the first region 600, the first direction intersects the second direction. The first metal lines 111 and the second metal lines 121 are interwoven to form pixel units in an array arrangement.

In the embodiment, the display panel 10 further includes a display control assembly 400. The display control assembly 400 is disposed on the first substrate 100, and the display control assembly 400 is separately connected to the first metal lines 111 and the second metal lines 121. The first metal lines 111 are scan lines, and the second metal lines 121 are data lines: scan signals are transmitted through the first metal lines 111 and data signals are transmitted through the second metal lines 121, so that the control over the display state of various regions in the display panel 10 is achieved by the display control assembly 400.

Optionally, in the embodiment, the display panel 10 further includes a heating control assembly 500. The first metal layer 110 includes third segments 1123, the heating control assembly 500 is connected to third metal lines 112, and the heating control assembly 500 is configured to provide heating signals for the third metal lines 112 to heat the display panel 10 through the third metal lines 112 which are disposed in the same layer as the first metal lines 111. Since the third metal lines 112 are disposed in the same layer as the first metal lines 111, it is not necessary to individually dispose a film layer for disposing circuits having a heating effect, the thickness of the entire display panel 10 does not need to be increased, and is it not necessary to add an exposure procedure and an individual mask for an additional patterned film layer, which is conducive to the lightness and thinning of the display panel 10: moreover, the process is simple and the costs are low.

In the embodiment, the third metal lines 112 are disposed in the first metal layer 110, and one third metal line 112 is disposed between two adjacent first metal lines 111, thus avoiding a short circuit between the third metal line 112 and the first metal line 111, and ensuring that display signals and heating signals can be transmitted and received independently of each other.

Optionally, in the embodiment, a third metal line 112 includes at least two first segments 1121 extending in the first direction and at least two second segments 1122 extending in the second direction, and two adjacent first segments 1121 are connected by one second segment 1122. The bending arrangement of the third metal line 112 is achieved through the first segments 1121 and the second segments 1122 which are extend in different directions, so that heating uniformity is improved. Moreover, for different subpixels arranged in the first direction, the third metal line 112 is disposed on two opposite sides of subpixels in the second direction, respectively, so that the third metal line 112 is disposed adjacent to one first metal line 111 and third metal line 112 in the different subpixels is also disposed adjacent to one of two first metal lines 111 that define one subpixel in the different subpixels. In this manner, it is avoided that the parasitic capacitance between the third metal line 112 and some first metal lines 111 is much greater than the parasitic capacitance between the third metal line 112 and other first metal lines 111, so that the load between different first metal lines is balanced and display uniformity is improved.

Figure 19:
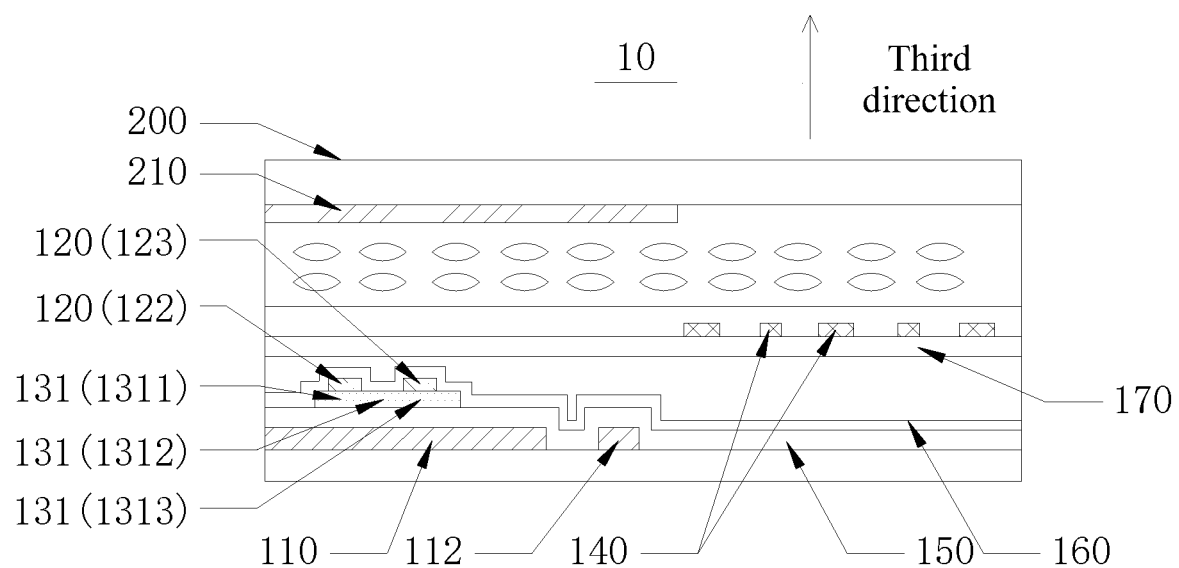
FIG. 19 is a sectional diagram of a display panel 10 according to an embodiment of the present disclosure.

FIG. 19 is a sectional diagram of a display panel 10 according to an embodiment of the present disclosure. Reference is made to FIGS. 1 to 4 and FIG. 19. It is to be noted that the display panel 10 further includes a light-shielding layer 210. The light-shielding layer 210 is disposed on a side of a second panel facing the liquid crystal layer 300. The third metal lines 112 and the light-shielding layer 210 are laminated in the thickness direction of the display panel 10, and the light-shielding layer 210 overlaps the third metal lines 112, so that the light-shielding layer 210 shields the third metal line 112 to prevent human eyes from directly observing the third metal lines 112 from one side of the second substrate 200 and the resulting bad perception.

It is to be understood that in the embodiment, the light-shielding layer 210 and the first metal lines 111 and the second metal lines 121 are laminated and overlap in the thickness direction of the display panel 10, so that the light-shielding layer 210 shields the first metal lines 111 and the second metal lines 121 to prevent human eyes from directly observing the first metal lines 111 and the second metal lines 121 from one side of the second panel and the resulting bad perception.

It is to be noted that in the embodiment, the third metal lines 112 are selected as heating lines, so that better heating efficiency can be obtained compared with using indium tin oxide as heating lines. After heating signals are applied to the third metal lines 112, heat can be generated quickly, and the heating speed of the liquid crystal can be improved: moreover, better heat dissipation can also be achieved with the third metal lines 112 when heating is not required. In this solution, since the heating speed is relatively high after the metal heating lines are used, to avoid that the temperature of the region where the third metal lines 112 are disposed rises quickly and the temperature of the region where no third metal line 112 is disposed rises slowly, leading to an excessive temperature difference between different regions, a large difference in liquid crystal performance at different positions and the resulting poor display effect, the third metal line 112 in the embodiment includes first segments 1121 extending in the first direction and second segments 1122 extending in the second direction, so that the distribution uniformity of the third metal lines 112 in the panel is improved by means of the bending shape, and thus heating uniformity is improved.

Further, since the bending third metal lines 112 are used, and in different subpixels, the third metal line 112 is adjacent to different first metal lines 111: overlapping positions of the third metal line 112 and different second metal lines 121 are also located at different positions in the second direction; and overlapping positions of the third metal line 112 and different first transparent electrode layers 140 are located at different positions and overlapping positions of the third metal line 112 and different second transparent electrode layers 170 are also located at different positions in the second direction. Thus, the parasitic capacitance distribution between the third metal lines 112 and the first metal lines 111, the second metal lines 121, the first transparent electrode layer 140 or the second transparent electrode layer 170 is improved. In this manner, the third metal lines 112 are prevented from affecting display signals during the heating process, and the display effect is improved.

It is to be noted that since the third metal lines 112 are used as the heating lines and the metal material may cause light reflection, the light-shielding layer 210 is disposed above the metal lines to prevent light reflection and improve the display effect. Further, in the embodiment, the light-shielding layer 210 includes metal particles or graphite particles, so that the heat conduction effect of the light-shielding layer is improved, and thus the heating effect can be further improved by the light-shielding layer 210 overlapping the third metal lines 112.

Figure 5:
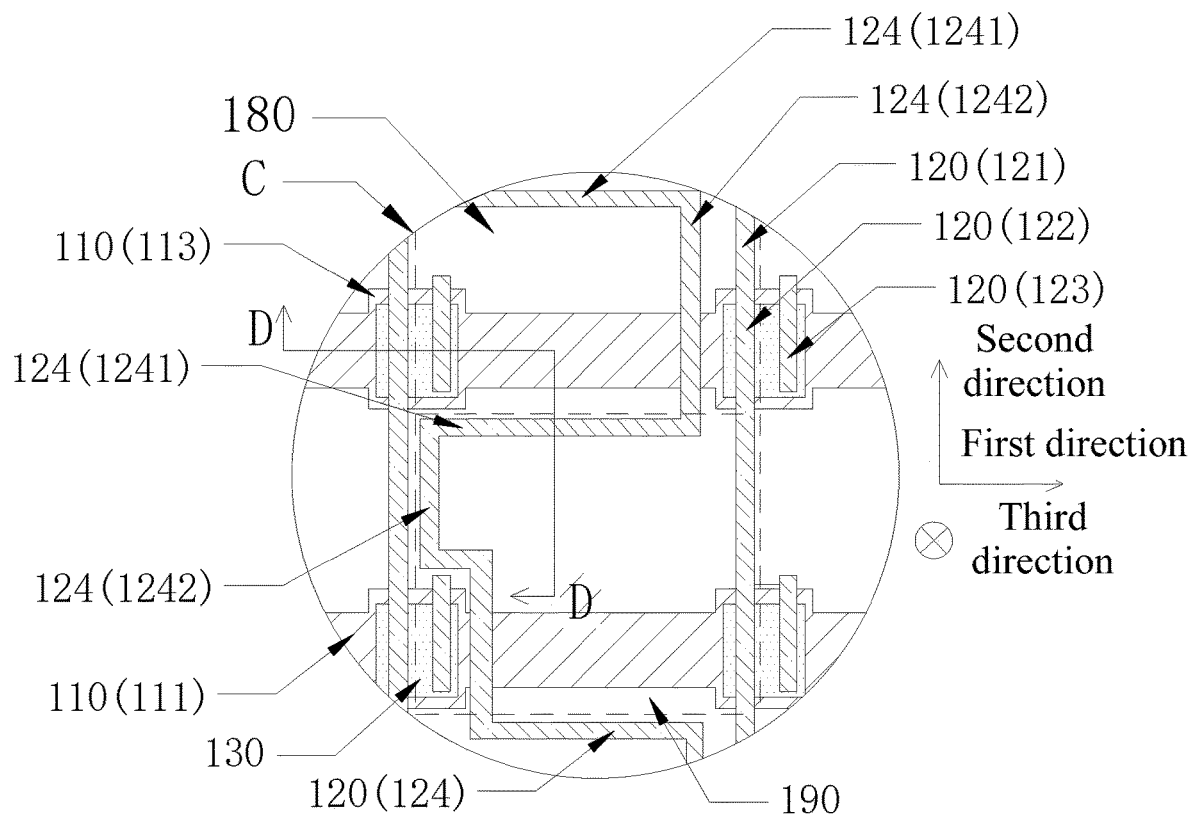
FIG. 5 is a partial enlarged diagram of region C in FIG. 2.
Figure 6:
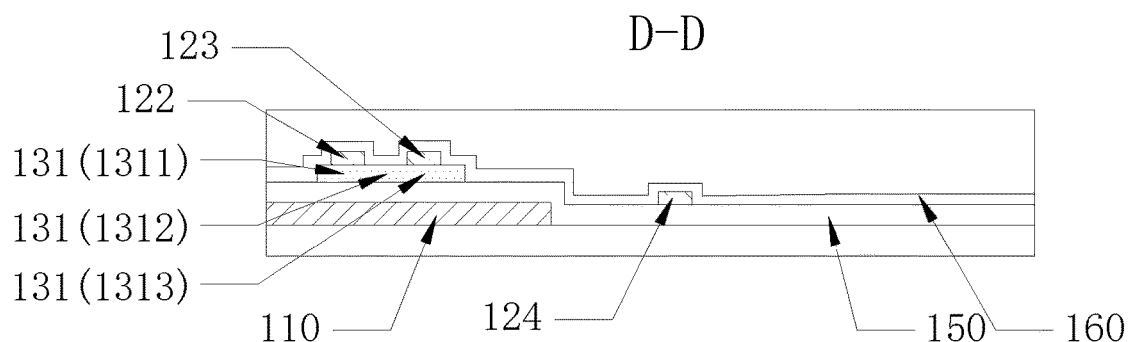
FIG. 6 is a sectional diagram taken along direction D-D in FIG. 5.

FIG. 5 is a partial enlarged diagram of region C in FIG. 2, and FIG. 6 is a sectional diagram taken along direction D-D in FIG. 5. Reference is made to FIGS. 1 to 2 and FIGS. 5 to 6. In the embodiment, third metal lines 124 may be disposed in the second metal layer 120, and the heating control assembly 500 is connected to the third metal lines 124. The heating control assembly 500 is configured to provide heating signals for the third metal lines 124 to heat the display panel 10 through the third metal lines 124 disposed in the same layer as the second metal lines 121. Since the third metal lines 124 are disposed in the same layer as the second metal lines 121, it is not necessary to individually dispose a film layer for disposing circuits having a heating effect, the thickness of the entire display panel 10 does not need to be increased, and is it not necessary to add an exposure procedure and an individual mask for an additional patterned film layer, which is also conducive to the lightness and thinning of the display panel 10: moreover, the process is simple and the costs are low.

In the embodiment, the third metal lines 124 are disposed in the second metal layer 120, and one third metal line 124 is disposed between two adjacent second metal lines 121, so that avoiding the short circuit between the third metal line 124 and the second metal line 121, and ensuring that display signals and heating signals can be transmitted and received independently of each other.

Reference is made to FIGS. 1 to 6. It is to be understood that in other optional embodiments, the third metal lines 124 may also be disposed in both the first metal layer 110 and the second metal layer 120, and the heating control assembly 500 is connected to the third metal lines 124. The heating control assembly 500 is configured to provide heating signals for the third metal lines 124 to heat the display panel 10 through third metal lines 124 which are disposed in the same layer as the first metal lines 111 and third metal lines 124 which are disposed in the same layer as the second metal lines 121. Since the third metal lines 124 are disposed in the same layer as the first metal lines 111 and the second metal lines 121, it is not necessary to individually dispose a film layer for disposing circuits having a heating effect, the thickness of the entire display panel 10 does not need to be increased, and is it not necessary to add an exposure procedure and an individual mask for an additional patterned film layer, which is also conducive to the lightness and thinning of the display panel 10: moreover, the process is simple and the costs are low. Moreover, two layers of metal heating lines are disposed, so that the heating rate and uniformity can be improved.

Reference is continuously made to FIGS. 1 to 4. Optionally, in the embodiment, in the first region 600, the first segment 1121 is disposed adjacent to the first metal line 111, a minimum gap between the first segment 1121 and the first metal line 111 in the second direction is D1, and a distance between two adjacent first metal lines is D2, where $0<D1\leq 0.34*D2$. The first segment 1121 is disposed adjacent to the first metal line 111, so that the distance between the first metal line 111 and the third metal line 112 is reduced. Since both the first metal line 111 and the third metal line 112 are shielded by the light-shielding layer 210, the region between the first metal line 111 and the third metal line 112 is also shielded: therefore, the gap between the first metal line 111 and the third metal line 112 is minimized so that the effect of reducing the area of the light-shielding layer 210 and improving the light transmittance of the display panel 10 is achieved.

Similarly, in the embodiment, in the first region 600, the second segment 1122 is disposed adjacent to the second metal line 121, a minimum gap exists between the second segment 1122 and the second metal line 121 in the first direction is D3, and a distance between two adjacent second metal lines 121 is D4, where $0<D3\leq 0.34*D4$. The second segment 1122 is disposed adjacent to the second metal line 121, so that the distance between the second metal line 121 and the third metal line 112 is reduced. The light-shielding layer 210 connected as a whole within a subpixel is used for shielding the second segment 1122 and the second metal line 121 which are within the subpixel, so that the pattern design of the light-shielding layer 210 is simplified. Since both the second metal line 121 and the third metal line 112 are shielded by the light-shielding layer 210, the region between the second metal line 121 and the third metal line 112 is also shielded: therefore, the gap between the second metal line 121 and the third metal line 112 is minimized, and at the same time, the effect of reducing the area of the light-shielding layer 210 and improving the light transmittance of the display panel 10 is achieved. In addition, a certain deviation exists in the alignment process of the first substrate 100 and the second substrate 200: if a light-shielding layer 210 for shielding the second segment 1122 and a light-shielding layer 210 for shielding the second metal line 121 are individually disposed, to ensure the complete shielding of the second segment 1122 and the second metal line 121, redundant areas need to be designed for the light-shielding layers 210 respectively. In the embodiment, the gap between the second metal line 121 and the third metal line 112 is minimized, so that the shielding can be achieved by the light-shielding layer 210 connected as a whole; the second metal line 121 and the third metal line 112 may be considered as a whole which needs to be shielded, and only one redundant area needs to be designed, so that the area of the light-shielding layer 210 is further reduced and the light transmittance of the display panel 10 is improved.

Optionally, in the embodiment, in the first region 600, the first metal lines 111 intersect the second metal lines 121 to define subpixels. A subpixel includes: a portion of one first metal line 111 defining the subpixel and corresponding to the subpixel, and, a portion of one second metal line 121 defining the subpixel and corresponding to the subpixel. At least one subpixel includes at least one first segment 1121 and at least one second segment 1122. The first segment 1121 and the second segment 1122 are disposed in the subpixel, so that the bending arrangement of the third metal line 112 is achieved, and heating uniformity is improved.

Further, since the bending third metal lines 112 are used, in different subpixels, the first segment 1121 and the second segment 1122 are adjacent to different first metal lines 111 and different second metal lines 121: overlapping positions of the third metal line 112 and different second metal lines 121 are also located at different positions in the second direction; and overlapping positions of the third metal line 112 and different first transparent electrode layers 140 and second transparent electrode layers 170 are also located at different positions in the second direction. Thus, the parasitic capacitance distribution between the third metal lines 112 and the first metal lines 111, the second metal lines 121, the first transparent electrode layer 140 or the second transparent electrode layer 170 is improved: especially the capacitance distribution between the third metal lines 112 and the first metal lines 111 which are disposed in the same layer is improved. In this manner, the third metal lines 112 are prevented from affecting display signals during the heating process, and the display effect is improved Optionally, in the embodiment, the third metal lines 112 are disposed in the first metal layer 110. For a first subpixel 180 and a second subpixel 190 which are adjacent in the first direction, a first segment 1121 in the first subpixel 120 is adjacent to a first metal line 111 corresponding to the first subpixel 180, and a first segment 1121 in the second subpixel 190 is away from the first metal line 111 corresponding to the second subpixel 190. The first metal line 111 extends through the first subpixel and the second subpixel in the first direction. By disposing first segments 1121 in adjacent subpixels away from each other, the distribution area of the third metal lines 112 on the first substrate 100 is optimized, and the heating uniformity is improved.

It is to be understood that in other optional embodiments, for a first subpixel 180 and a second subpixel 190 which are adjacent in the first direction, a first segment 1121 in the first subpixel 180 is adjacent to a first metal line 111 corresponding to the first subpixel 180, and a first segment 1121 in the second subpixel 190 is adjacent to the first metal line 111 corresponding to the second subpixel 190, so that the wiring design of the third metal lines 112 is simplified in some regions, and the process difficulty is also simplified.

It is also to be understood that in other optional embodiments, for a first subpixel 180 and a second subpixel 190 which are adjacent in the first direction, a first segment 1121 in the first subpixel 180 is away from a first metal line 111 corresponding to the first subpixel 180, and a first segment 1121 in the second subpixel 190 is away from the first metal line 111 corresponding to the second subpixel 190, so that the wiring design of the third metal lines 112 is simplified in some regions, and the process difficulty is also simplified.

Optionally, in the embodiment, for the first subpixel 180 and the second subpixel 190 which are adjacent in the first direction, a second segment 1122 in the first subpixel 180 is adjacent to a second metal line 121 of the first subpixel 180, and a second segment 1122 in the second subpixel 190 is adjacent to a second metal line 121 of the second subpixel 190. By arranging second segments 1122 at intervals between different subpixels, the distribution of the third metal lines 112 is optimized, and the heating uniformity is improved.

It is to be understood that in other optional embodiments, the second segment 1122 in the first subpixel 180 is away from the second metal line 121 of the first subpixel 180, and the second segment 1122 in the second subpixel 190 is away from the second metal line 121 of the second subpixel 190. Similarly, by arranging second segments 1122 at intervals between different subpixels, the distribution of the third metal lines 112 is optimized, and the heating uniformity is improved.

Reference is made to FIGS. 5 to 6. In the embodiment, the third metal lines 124 are disposed in the second metal layer 120. For a first subpixel 180 and a second subpixel 190 which are adjacent in the second direction, a second segment 1242 of a third metal line in the first subpixel 180 is adjacent to a second metal line 121 corresponding to the first subpixel 180, and a second segment 1242 of a third metal line in the second subpixel 190 is away from the second metal line 121 corresponding to the first subpixel 180. By disposing second segments 1242 of adjacent subpixels away from each other, the distribution area of the third metal lines 124 on the first substrate 100 is optimized, and the heating uniformity is improved.

It is to be understood that in other optional embodiments, for a first subpixel 180 and a second subpixel 190 which are adjacent in the second direction, a second segment 1242 of a third metal line in the first subpixel 180 is adjacent to a second metal line 121 corresponding to the first subpixel 180, and a second segment 1242 of a third metal line in the second subpixel 190 is adjacent to the second metal line 121 corresponding to the second subpixel 180, and the second metal line 121 extends through the first subpixel and the second subpixel in the second direction, so that the wiring design of the third metal lines 124 is simplified in some regions, and the process difficulty is also simplified.

It is also to be understood that in other optional embodiments, for a first subpixel 180 and a second subpixel 190 which are adjacent in the second direction, a second segment 1242 of a third metal line in the first subpixel 180 is away from a first metal line 124 corresponding to the first subpixel 180, and a second segment 1242 of a third metal line in the second subpixel 190 is away from the first metal line 111 corresponding to the second subpixel 180, so that the wiring design of the third metal lines 112 is simplified in some regions, and the process difficulty is also simplified.

Optionally, in the embodiment, for a first subpixel 180 and a second subpixel 190 which are adjacent in the second direction, at least one first segment 1241 in the first subpixel 180 is away form a first metal line 111 of the first subpixel 180, and at least one first segment 1241 in the second subpixel 190 is away from a first metal line 111 of the second subpixel 190. By arranging first segments 1241 at intervals between different subpixels, the distribution of the third metal lines 124 is optimized, and the heating uniformity is improved.

It is to be understood that in other optional embodiments, the first segment 1122 in the first subpixel 180 is adjacent to the first metal line 111 of the first subpixel 180, and the first segment 1241 in the second subpixel 190 is adjacent to the first metal line 111 of the second subpixel 190. Similarly, by arranging first segments 1241 at intervals between different subpixels, the distribution of the third metal lines 124 is optimized, and the heating uniformity is improved.

Figure 7:
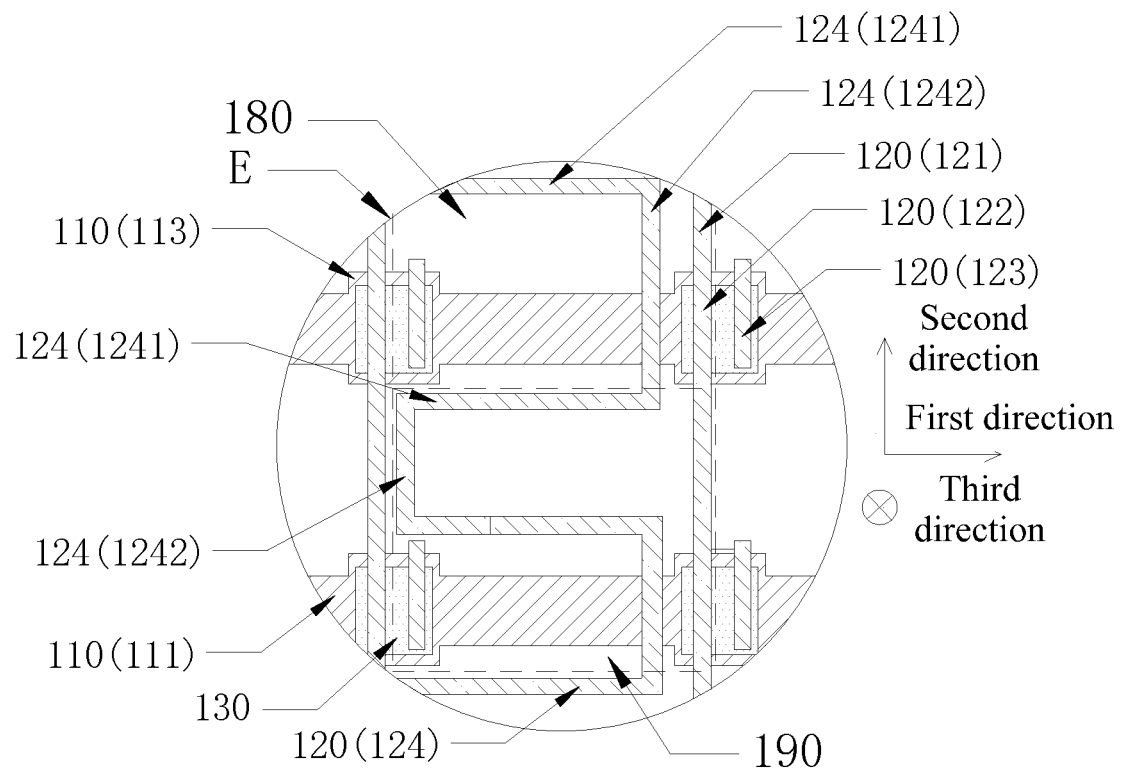
FIG. 7 is a partial enlarged diagram of region E in FIG. 2.

FIG. 7 is a partial enlarged diagram of region E in FIG. 2. Reference is made to FIGS. 1 to 2 and FIG. 7. At least one subpixel includes at least two first segments 1241 and at least one second segment 1242. In this manner, multiple first segments 1241 are intensively disposed in at least part of subpixels, so that the region of the at least part of subpixels has the third metal lines 124 of a higher density, and thus a better heating effect is achieved for the region.

In the embodiment, some subpixels include two first segments 1241 and one second segment 1242. In this manner, the density of the first segments 1241 is increased and the two first segments 1241 can be disposed adjacent to two opposite sides of the subpixel respectively, so that an opening region at the central position of the subpixel is leaved, and thus excessive blocking of light is avoided.

It is to be understood that in other optional embodiments, at least one subpixel may include at least two second segments 1242 and at least one first segment 1241. In this manner, multiple second segments 1242 are intensively disposed in at least part of subpixels, so that the region has the third metal lines 124 of a higher density, and thus a better heating effect is achieved for the region.

Optionally, in the embodiment, the display panel 10 includes blue color resistors, red color resistors and green color resistors which are sequentially arranged in the first direction, and a blue color resistor overlaps a subpixel including at least two first segments 1241 or at least two second segments 1242 in the third direction. Since disposing more than one first segment 1241 or second segment 1242 in some subpixels will decrease the opening ratio of the subpixel and affect the brightness, more than one first segment 1241 or second segment 1242 are disposed at positions corresponding to the blue color resistor which contributes less to the overall brightness, so that the overall brightness of the display panel 10 can be better improved.

It is to be understood that in other optional embodiments, blue color resistors, red color resistors and green color resistors may also be sequentially arranged in the second direction or have other arrangement rules, which is not specifically limited.

Figure 8:
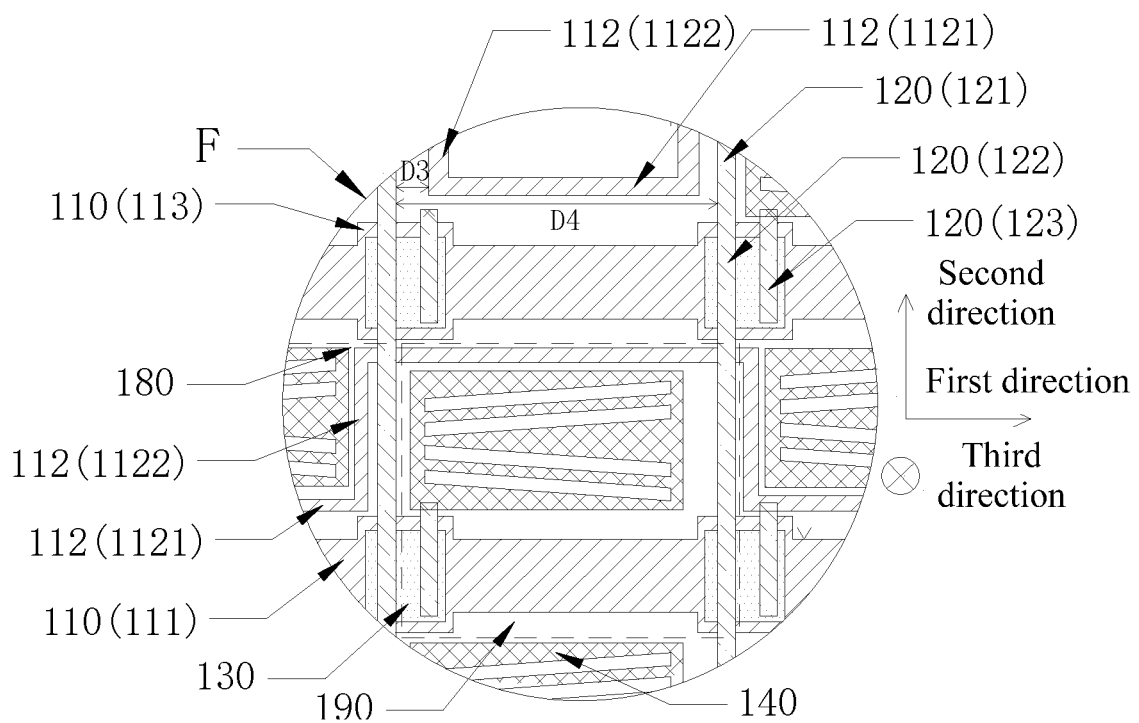
FIG. 8 is a partial enlarged diagram of region F in FIG. 2.

FIG. 8 is a partial enlarged diagram of region F in FIG. 2. Reference is made to FIG. 1, FIG. 2 and FIG. 8. In the embodiment, the subpixels at least include two adjacent subpixels, one subpixel of the two adjacent subpixels includes one first segment 1121 and one second segment 1122, the other subpixel of the two adjacent subpixels includes one first segment 1121, so that less bending structure is disposed in some subpixels to simplify the wiring design and process difficulty, and moreover, the density of the third metal lines 124 can be reduced in local regions to control the heating effect.

It is to be understood that in other optional embodiments, one subpixel includes one first segment 1121 and one second segment 1122, the other subpixel includes one second segment 1122, so that less bending structure can be disposed in some subpixels to simplify the wiring design and process difficulty, and moreover, the density of the third metal lines 124 can also be reduced in local regions to control the heating effect.

Figure 17:
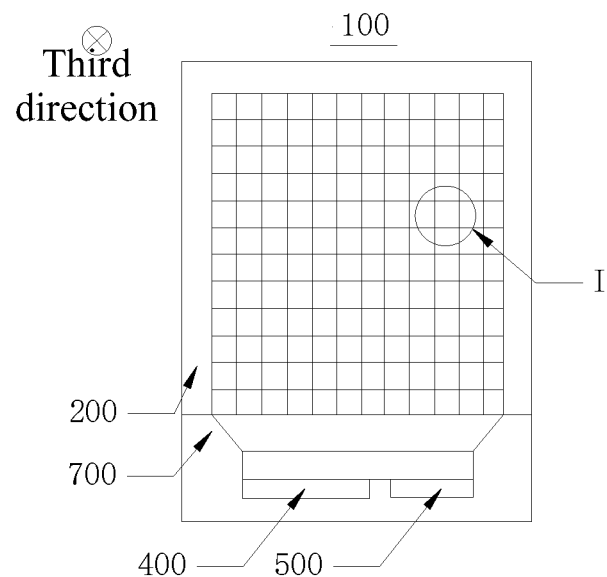
FIG. 17 is a structural diagram of a relative position of a first substrate and a second substrate according to an embodiment of the present disclosure.
Figure 18:
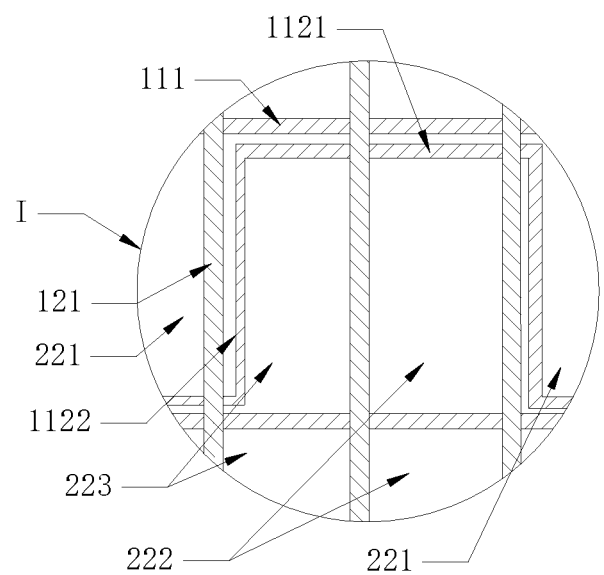
FIG. 18 is a partial enlarged diagram of region I in FIG. 17.

FIG. 17 is a structural diagram of a relative position of a first substrate and a second substrate according to an embodiment of the present disclosure, and FIG. 18 is a partial enlarged diagram of region I in FIG. 17. Reference is made to FIG. 1, FIG. 2, FIG. 8 and FIGS. 17 to 18. Optionally, in the embodiment, the display panel 10 includes blue color resistors 221, red color resistors 223 and green color resistors 222 which are sequentially arranged in the first direction, and a green color resistor 222 overlaps a subpixel including one first segment 1121 or one second segment 1122 in the third direction. Since disposing less first segment 1121 or second segment 1122 in some subpixels will increase the aperture ratio of the subpixel and improve the brightness, less first segment 1121 or second segment 1122 is disposed at positions corresponding to the green color resistor 222 which contributes more to the overall brightness, so that the overall brightness of the display panel 10 can be better improved.

It is to be understood that in other optional embodiments, blue color resistors 221, red color resistors 223 and green color resistors 222 may also be sequentially arranged in the second direction or have other arrangement rules, which is not specifically limited.

Reference is continuously made to FIGS. 1 to 4. In the embodiment, in the first region 600, a subpixel includes a first electrode 113 disposed in the same layer as the first metal lines 111, a second electrode 122 and a third electrode 123 which are disposed in the same layer as the second metal lines 121, and a semiconductor region 131. The semiconductor region 131 is connected to the second electrode 122 and the third electrode 123 separately. The state of the semiconductor layer 130 is controlled through the first electrode 113, and then the conduction between the second electrode 122 and the third electrode 123 is controlled.

Optionally, in the embodiment, in at least one subpixel, the third electrode 123, the semiconductor region 131 and the first electrode 113 partially overlap the second segment 1122 in the second direction. Since the second segment 1122 is connected to the first segment 1121, and the second segment 1122 extends in the second direction instead of the first direction, when the second segment 1122 partially overlaps the third electrode 123, the semiconductor region 131 and the first electrode 113 separately in the second direction, the second segment 1122 is disposed adjacent to the third electrode 123, the semiconductor region 131 and the first electrode 113 in the first direction, that is, the second segment 1122 is disposed adjacent to the second metal line 121 defining the subpixel in the first direction, so that metal lines are disposed adjacent to each other and the opening ratio is increased.

It is to be understood that in other optional embodiments, as long as at least one of the second electrode 122, the third electrode 123, the semiconductor region 131 or the first electrode 113 at least partially overlaps the second segment 1122 in the second direction, the preceding effect can be achieved, and the specific overlapping condition may be selected according to wiring design difficulties and process requirements, which is not specifically limited.

It is also to be understood that in other optional embodiments, in at least one subpixel, at least one of the first electrode 113 or the semiconductor region 131 at least partially overlaps the first segment 1121 in the first direction. Since the second segment 1122 is connected to the first segment 1121, and the first segment 1121 extends in the first direction instead of the second direction, when at least one of the first electrode 113 or the semiconductor region 131 partially overlaps the first segment 1121 in the first direction, the first segment 1121 is disposed adjacent to at least one of the first electrode 113 or the semiconductor region 131 in the second direction, that is, the first segment 1121 is disposed adjacent to the first metal line 111 defining the subpixel in the second direction, so that metal lines are disposed adjacent to each other and the opening ratio is increased.

Optionally, in the embodiment, the third electrode 123 includes a first portion 1231 and a second portion 1232, the first portion 1231 and the first electrode 113 overlap in the third direction, the second portion 1232 and the first electrode 113 are staggered in the third direction, and the first segment 1121 overlaps the second portion 1232 in the first direction. The third electrode 123 is disposed to partially protrude from the first electrode 113 so as to be connected to a pixel electrode. The first segment 1121 is disposed to overlap the protruding second portion 1232 in the first direction, so that the first segment 1121 can be disposed more adjacent to the first metal line 111, and the opening ratio is further improved.

It is to be understood that in other optional embodiments, the second segment 1122 may also be disposed to overlap the second portion 1232 in the second direction. The second segment 1122 may be disposed to overlap the protruding second portion 1232 in the second direction, so that the second segment 1122 can be disposed more adjacent to the second metal line 121, and thus the opening ratio is further increased.

Optionally, in the embodiment, in at least one subpixel, at least one of the first electrode 113 or the semiconductor region 131 at least partially overlaps the first segment 1121 in the first direction, and at least one of the second electrode 122, the third electrode 123, the semiconductor region 131 or the first electrode 113 at least partially overlaps the second segment 1122 in the second direction. The first segment 1121 is disposed adjacent to the first metal line 111, and the second segment 1122 is disposed adjacent to the second metal line 121, so that the space occupied between metal lines is minimized and the opening ratio is increased.

The third metal line 112 includes a third segment 1123, one end of the third segment 1123 is connected to a first segment 1121, and the other end of the third segment 1123 is connected to a second segment 1122. The third segment 1123 connects the first segment 1121 and the second segment 1122, the first segment 1121 and the second segment 1122 are disposed adjacent to the first metal line 111 and the second metal line 121 respectively, and the first electrode 113, the second electrode 122, the third electrode 123 and the semiconductor layer 130 are disposed at the intersection of the first metal line 111 and the second metal line 121, so that the third segment 1123 is disposed around the outline formed by the first electrode 113, the second electrode 122, the third electrode 123 and the semiconductor layer 130 and may be of a broken-line shape having multiple segments.

Figure 16:
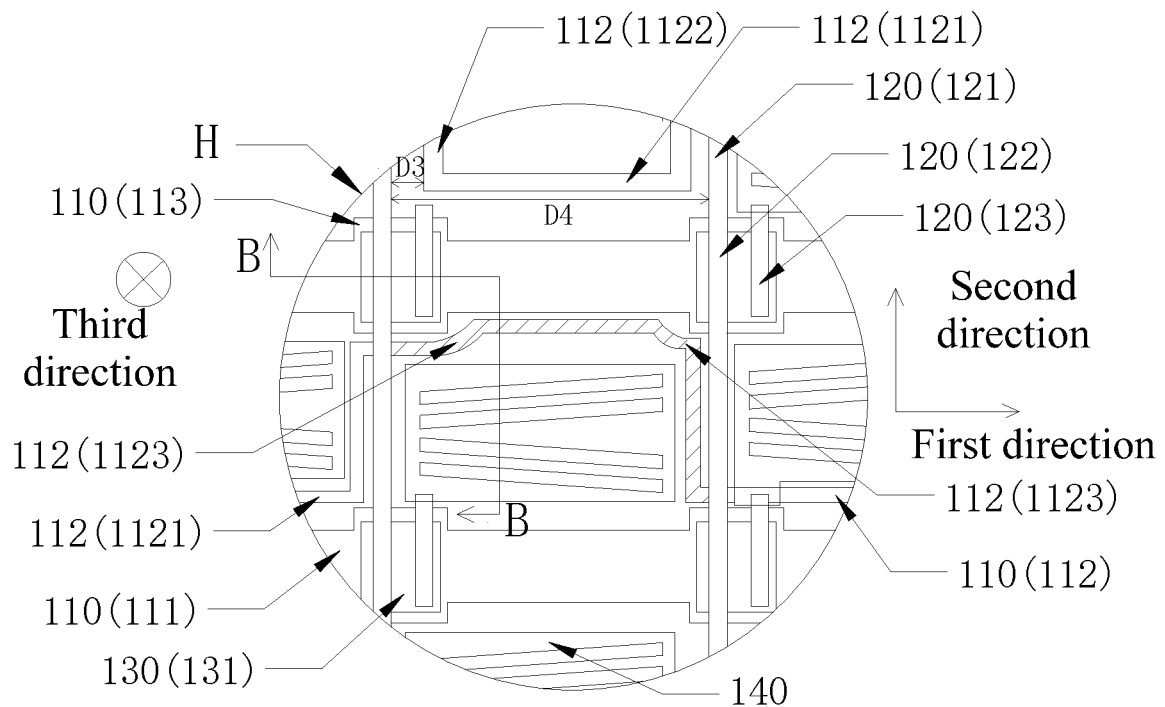
FIG. 16 is a partial enlarged diagram of region H in FIG. 2.

FIG. 16 is a partial enlarged diagram of region H in FIG. 2. Reference is made to FIGS. 1 to 4 and FIG. 16. It is to be understood that in other optional embodiments, the third segment 1123 is disposed around the outline formed by the first electrode 113, the second electrode 122, the third electrode 123 and the semiconductor layer 130, and the third segment 1123 may be of a curved shape or a combination of a curved shape and a broken-line shape, so that the shape of the third segment 1123 is adjusted according to the specific shape of the outline to reduce the impact on the opening ratio.

Optionally, in the embodiment, the third segment 1123 includes a first section 11231 and a second section 11232, one end of the first section 11231 is connected to the second segment 1122, the other end of the first section 11231 is connected to the second section 11232, and one end of the second section 11232 away from the first section 11231 is connected to the first segment 1121; and a connecting line between two ends of at least one of the first section 11231 or the second section 11232 intersects with the first direction and the second direction, respectively. The extension direction of part of the third segment 1123 intersects both the first direction and the second direction, so that the wiring of the third metal line 112 in the structure of the transistor is simplified in the form of slanted wiring or arc-shaped wiring, and the design difficulty and the risk of breaking due to too many bent line segments are avoided.

Reference is made to FIGS. 1 to 2 and FIGS. 5 to 8. In the embodiment, the semiconductor region 131 is disposed in a different layer from the second electrode 122 and the third electrode 123, the semiconductor region 131 includes a first semiconductor block 1311, a second semiconductor block 1313 and a third semiconductor block 1312, the first semiconductor block 1311 overlaps the second electrode 122, the second semiconductor block 1313 overlaps the third electrode 123, and the third semiconductor block 1312 connects the first semiconductor block 1311 and the second semiconductor block 1313. The third metal lines 124 are disposed away from the third semiconductor block 1312.

FIG. 7 is a partial enlarged diagram of region E in FIG. 2. Reference is made to FIGS. 1 to 2 and FIGS. 5 to 7. Specifically, in the embodiment shown in FIG. 7, the third metal line 124 is disposed in the second metal layer 120. For two subpixels which are adjacent in the first direction, a second metal line 121 and a third semiconductor block 1312 in a first subpixel are disposed on two opposite sides in the first direction, a third metal line 124 in the first subpixel is disposed adjacent to the second metal line 121 in the first subpixel and away from a third semiconductor block 1312 in the first subpixel. A third semiconductor block 1312 in a second subpixel and the third metal line in the first subpixel are disposed on two sides of the second metal line 121 in the first subpixel respectively.

The performance of the third semiconductor block 1312 has great impact on the display effect when the display panel 10 is working, and a certain electric field is generated around the third metal line 124 when the third metal line 124 is working, which may affect the performance of the third semiconductor block 1312 and cause the fluctuation of the performance. In addition, as the temperature changes, the performance of the semiconductor material also changes, and the closer to the third metal line 124, the more apparent the temperature change. Therefore, in the same subpixel, the third metal line 124 and the third semiconductor block 1312 are disposed on two sides of the subpixel respectively, and in adjacent subpixels, the third metal line 124 and the third semiconductor block 1312 are respectively disposed on two sides of at least one second metal line 121, so that in each subpixel, the impact of the electric field and the temperature change on the performance of the semiconductor can be reduced, and display stability can be improved.

It is to be noted that in the manner of dividing subpixels adopted in the embodiment, for a first subpixel and a second subpixel which are adjacent in the first direction, a third electrode 123 and a third semiconductor block 1312 in a second subpixel together with a second electrode 122 in a first subpixel compose a transistor. It is to be understood that in other optional embodiments, different manners for dividing subpixels may be adopted.

It is to be noted that in the embodiment, the third semiconductor block 1312 is a channel region of a corresponding transistor.

Optionally, in the embodiment, the third metal lines 124 are disposed in the second metal layer 120. In a subpixel, a second segment 1242 and a third electrode 123 are disposed on two opposite sides of the subpixel in the first direction respectively, and a third semiconductor block 1312 in the subpixel is disposed adjacent to the third electrode 123, so that the third metal line 124 and the channel region of the subpixel are specifically disposed away from each other.

Figure 9:
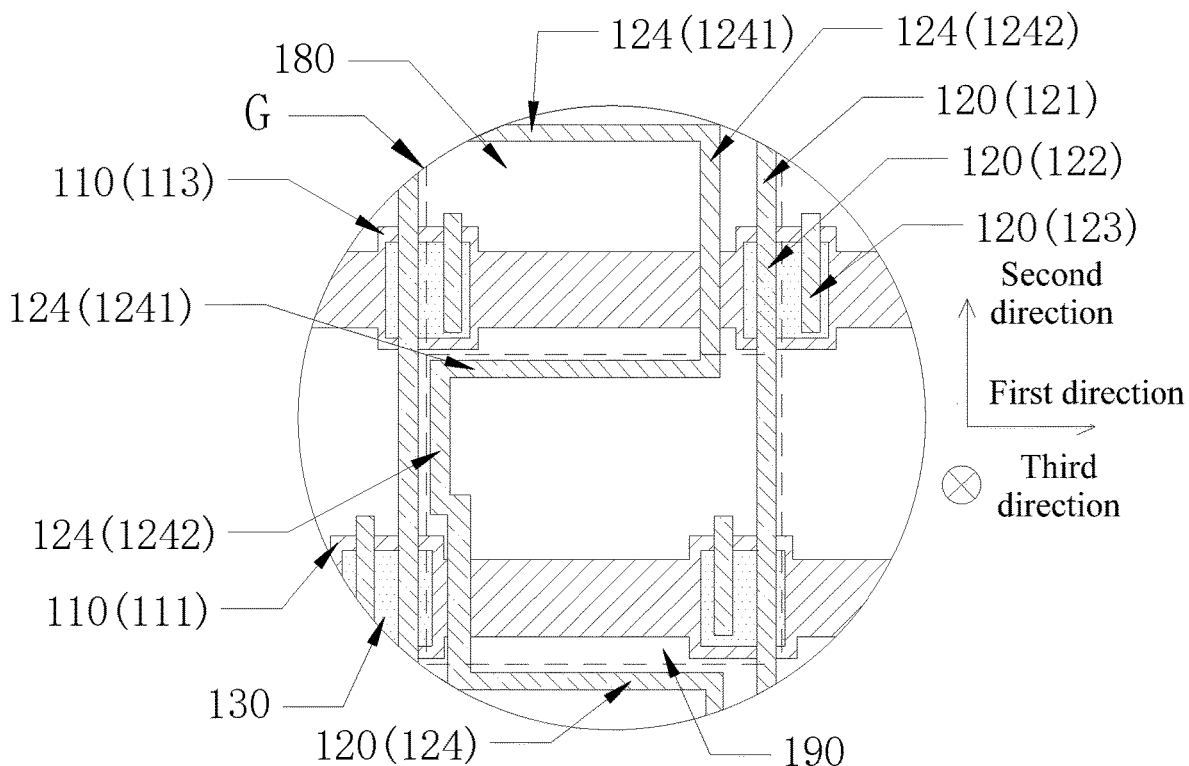
FIG. 9 is a partial enlarged diagram of region G in FIG. 2.

FIG. 9 is a partial enlarged diagram of region G in FIG. 2. Reference is made to FIG. 1-2, FIGS. 5 to 6 and FIG. 9. In the embodiment, for two subpixels which are adjacent in the second direction, a third electrode 123 in one subpixel is disposed adjacent to a first one of the second metal lines 121, and a third metal line 124 in the one subpixel is disposed adjacent to a second one of the second metal lines 121. A third electrode 123 in the other subpixel is disposed adjacent to the second one of the second metal lines 121, and a third metal line 124 in the other subpixel is disposed adjacent to the first one of the second metal lines 121. Transistors are arranged in a zigzag shape to match the third metal line 124 of the broken-line shape. For the subpixels which are adjacent in the second direction, second segments 1242 are disposed on two opposite sides of the adjacent subpixels in the first direction respectively. If transistors are disposed on the same side as the second metal line 120, some transistors may be adjacent to the third metal line 124, so that the working third metal line 124 affects the working state of the transistors and the poor display effect is generated. If the wiring of the third metal line 124 bypasses the transistor, and certain intervals are maintained to avoid the impact by the working third metal line 124 on the working state of the transistor, a large-area light-shielding layer 210 needs to be disposed to cover the third metal line 124, so that a large amount of subpixel areas are occupied and the opening ratio decreases. Therefore, in this solution, transistors are arranged in the zigzag shape to match the third metal line 124 in the broken-line shape, so that the occupancy on the area of the subpixel can be reduced while the third metal line 124 is ensured to be relatively away from the channel region in the transistor, and thus the display effect is further improved.

Figure 10:
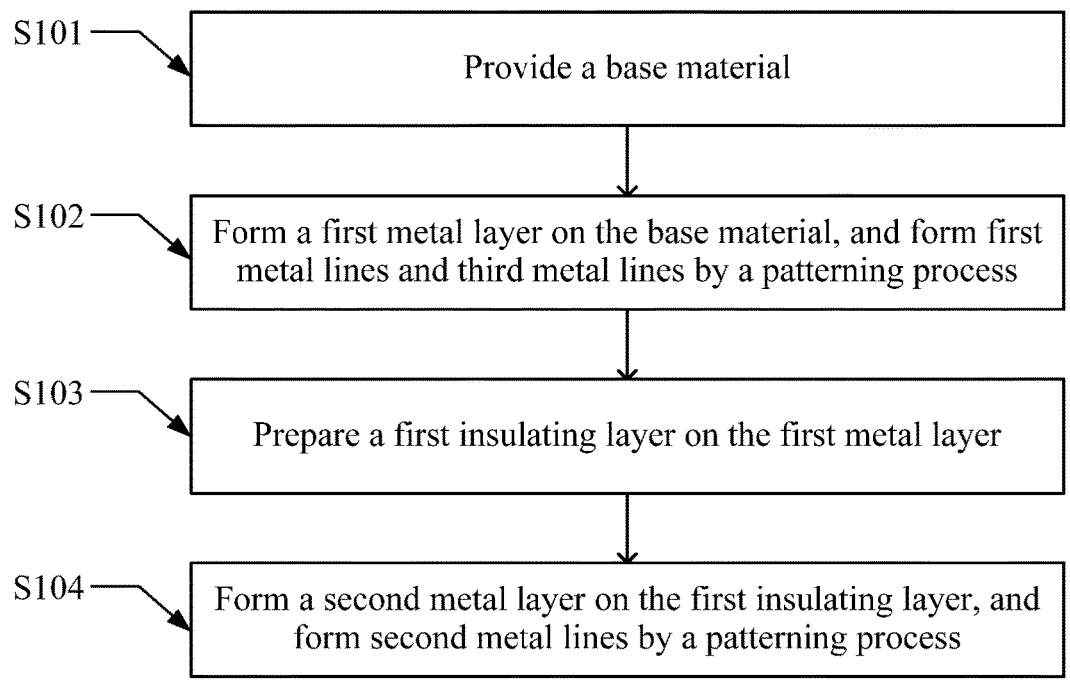
FIG. 10 is a flowchart of a method for manufacturing a display panel according to an embodiment of the present disclosure.

FIG. 10 is a flowchart of a method for manufacturing a display panel 10 according to an embodiment of the present disclosure. Reference is made to FIGS. 1 to 4 and FIG. 10. The method for manufacturing a display panel 10 provided in the embodiment of the present disclosure includes steps described below.

In S101, a base material is provided.

In the embodiment, the base material is a glass substrate.

It is to be understood that in other optional embodiments, the base material may also be a polyimide substrate or the like, which is not specifically limited here.

Figure 12:
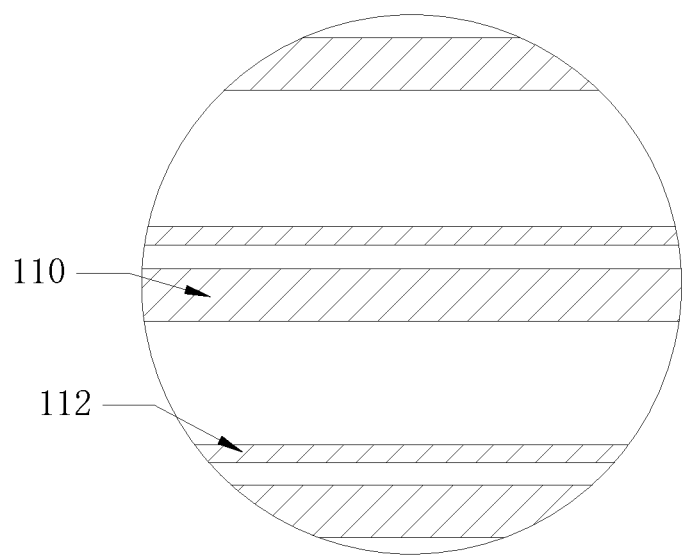
FIG. 12 is a structural diagram of a display panel 10 manufactured in a first intermediate process according to an embodiment of the present disclosure.

FIG. 12 is a structural diagram of a display panel 10 manufactured in a first intermediate process according to an embodiment of the present disclosure. Reference is made to FIGS. 1 to 4, FIG. 10 and FIG. 12.

In S102, a first metal layer 110 is formed on the base material, and first metal lines 111 and third metal lines 112 are formed by a patterning process.

It is to be noted that in the embodiment, the first metal lines 111 and the third metal lines 112 are formed after exposure using a mask in the patterning process. In this manner, without masks and processes of exposure, development and etching individually designed for the first metal lines 111 and the third metal lines 112 respectively, so that design costs and process costs are saved.

In S103, a first insulating layer 150 is prepared on the first metal layer 110.

Figure 13:
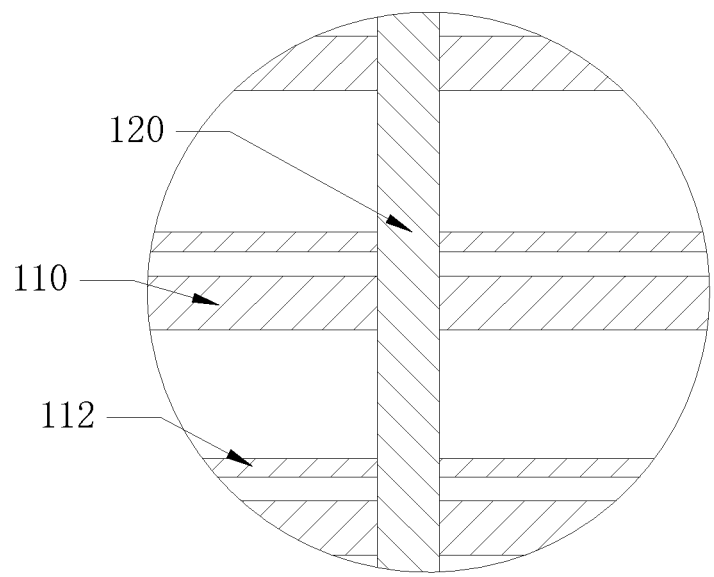
FIG. 13 is a structural diagram of a display panel 10 manufactured in a second intermediate process according to an embodiment of the present disclosure.

FIG. 13 is a structural diagram of a display panel 10 manufactured in a second intermediate process according to an embodiment of the present disclosure. Reference is made to FIGS. 1 to 4, and FIGS. 12 to 13.

In S104, a second metal layer 120 is formed on the first insulating layer 150, and second metal lines 121 are formed by a patterning process.

In the embodiment, the first metal lines 111 are scan lines, the second metal lines 121 are data lines, and the third metal lines 112 are heating lines: scan signals are transmitted through the first metal lines 111, data signals are transmitted through the second metal lines 121, and the display panel 10 is heated by the third metal lines 112. In this manner, functions of controlling the display state of various regions and heating various regions in the display panel 10 are achieved.

Figure 11:
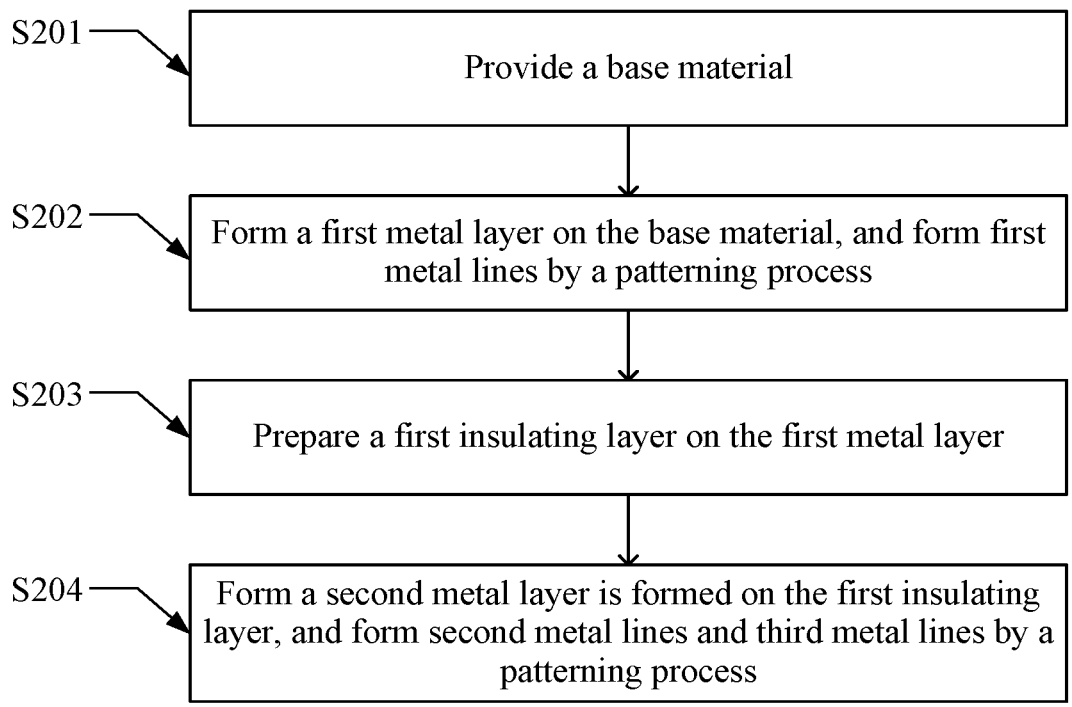
FIG. 11 is a flowchart of another method for manufacturing a display panel according to an embodiment of the present disclosure.

FIG. 11 is a flowchart of another method for manufacturing a display panel 10 according to an embodiment of the present disclosure. Reference is made to FIGS. 1 to 2, FIGS. 5 to 6 and FIG. 11. Another method for manufacturing a display panel 10 provided in the embodiment of the present disclosure includes steps described below.

In S201, a base material is provided.

In the embodiment, the base material is a glass substrate.

It is to be understood that in other optional embodiments, the base material may also be a polyimide substrate or the like, which is not specifically limited here.

Figure 14:
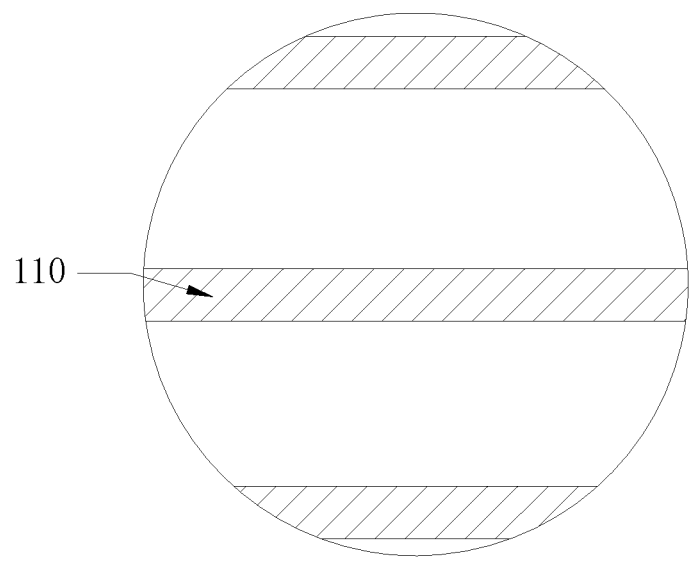
FIG. 14 is a structural diagram of another display panel 10 manufactured in a first intermediate process according to an embodiment of the present disclosure.

FIG. 14 is a structural diagram of another display panel 10 manufactured in a first intermediate process according to an embodiment of the present disclosure. Reference is made to FIGS. 1 to 2, FIGS. 5 to 6, FIG. 11 and FIG. 14.

In S202, a first metal layer 110 is formed on the base material, and first metal lines 111 are formed by a patterning process.

In S203, a first insulating layer 150 is prepared on the first metal layer 110.

Figure 15:
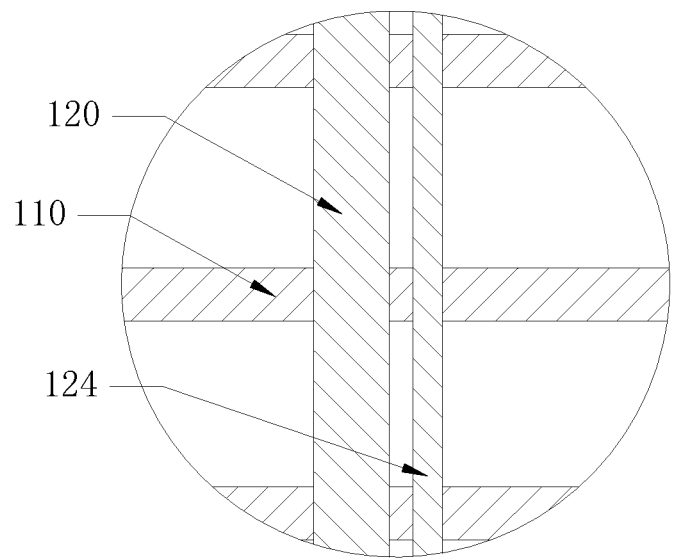
FIG. 15 is a structural diagram of another display panel 10 manufactured in a second intermediate process according to an embodiment of the present disclosure.

FIG. 15 is a structural diagram of another display panel 10 manufactured in a second intermediate process according to an embodiment of the present disclosure. Reference is made to FIGS. 1 to 2, FIGS. 5 to 6, FIG. 11 and FIGS. 14 to 15.

In S204, a second metal layer 120 is formed on the first insulating layer 150, and second metal lines 121 and third metal lines 124 are formed by a patterning process.

In the embodiment, the first metal lines 111 are scan lines, the second metal lines 121 are data lines, and the third metal lines 124 are heating lines: scan signals are transmitted through the first metal lines 111, data signals are transmitted through the second metal lines 121, and the display panel 10 is heated by the third metal lines 124. In this manner, functions of controlling the display state of various regions and heating various regions in the display panel 10 are achieved.

It is to be noted that in the embodiment, the second metal lines 121 and the third metal lines 124 are formed after exposure using a mask in the patterning process. In this manner, without masks and processes of exposure, development and etching individually designed for the second metal lines 121 and the third metal lines 124 respectively, so that design costs and process costs are saved.

The preceding description of the disclosed embodiments enables those skilled in the art to implement or use the present disclosure. Various modifications to these embodiments will be apparent to those skilled in the art, and the general principles defined herein may be implemented in other embodiments without departing from the spirit or scope of the disclosure. Therefore, the present disclosure is not intended to be limited to the embodiments shown herein but is to accord the widest scope consistent with the principles and novel features disclosed herein.

What is claimed is:

1. A display panel, comprising a base material, a first metal layer and a second metal layer; wherein the first metal layer and the second metal layer are laminated on the base material in a thickness direction of the display panel, the first metal layer comprises first metal lines, the second metal layer comprises second metal lines, the first metal lines extend in a first direction, and the second metal lines extend in a second direction; the display panel further comprises a first region and a second region surrounding the first region, and in the first region, the first direction intersects the second direction;

at least one of the first metal layer or the second metal layer comprises third metal lines, a third metal line of the third metal lines comprises at least two first segments extending in the first direction and at least two second segments extending in the second direction, and two adjacent first segments of the at least two first segments are connected by one second segment of the at least two second segments;

the display panel further comprises a light-shielding layer, the third metal lines and the light-shielding layer are laminated in the thickness direction of the display panel, and the light-shielding layer at least partially overlaps the third metal lines; and the display panel further comprises a heating control assembly, and the third metal lines are electrically connected to the heating control assembly;

wherein in the first region, a first segment of the at least two first segments is disposed adjacent to a first metal line of the first metal lines, a minimum gap between the first segment and the first metal line in the second direction is D1, and a distance between two adjacent first metal lines of the first metal lines is D2, wherein 0<D1≤0.34*D2; and a second segment of the at least two second segments is disposed adjacent to a second metal line of the second metal lines, a minimum gap between the second segment and the second metal line in the first direction is D3, and a distance between two adjacent second metal lines of the second metal lines is D4, wherein 0<D3≤0.34*D4.

2. The display panel according to claim 1, further comprising a liquid crystal layer, a first substrate and a second substrate, wherein the first substrate, the liquid crystal layer and the second substrate are sequentially laminated in a third direction, and the third direction is the thickness direction of the display panel; and the third metal lines are disposed on a side of the first substrate facing the liquid crystal layer, and the light-shielding layer is disposed on a side of the second substrate facing the liquid crystal layer.

3. The display panel according to claim 1, wherein in the first region, the first metal lines intersect the second metal lines to define subpixels, a subpixel of the subpixels comprises a portion of one first metal line defining the subpixel and corresponding to the subpixel, and a portion of one second metal line defining the subpixel and corresponding to the subpixel;

the third metal lines are disposed in the first metal layer, and at least one third metal line of the third metal lines is disposed between two adjacent first metal lines of the first metal lines; and the subpixels at least comprise two adjacent subpixels in the first direction, in the two adjacent subpixels, a first segment is disposed adjacent to a first metal line in one subpixel of the two adjacent subpixels, and a first segment is disposed away from a first metal line in another subpixel of the two subpixels.

4. The display panel according to claim 1, wherein in the first region, the first metal lines intersect the second metal lines to define subpixels, a subpixel of the subpixels comprises a portion of one first metal line defining the subpixel and corresponding to the subpixel, and a portion of one second metal line defining the subpixel and corresponding to the subpixel; and at least one subpixel of the subpixels comprises at least one first segment and at least one second segment.

5. The display panel according to claim 4, wherein the third metal lines are disposed in the first metal layer, for a first subpixel and a second subpixel which are adjacent in the first direction, a first segment in the first subpixel is adjacent to a first metal line corresponding to the first subpixel, and a first segment in the second subpixel is away from the first metal line corresponding to the second subpixel.

6. The display panel according to claim 5, wherein for the first subpixel and the second subpixel which are adjacent in the first direction, a second segment in the first subpixel is adjacent to a second metal line of the first subpixel, and a second segment in the second subpixel is adjacent to a second metal line of the second subpixel; or a second segment of the first subpixel is away from a second metal line of the first subpixel, and a second segment of the second subpixel is away from a second metal line of the second subpixel.

7. The display panel according to claim 4, wherein the third metal lines are disposed in the second metal layer, for a first subpixel and a second subpixel which are adjacent in the second direction, a second segment in the first subpixel is adjacent to a second metal line corresponding to the first subpixel, and a second segment in the second subpixel is away from the second metal line corresponding to the second subpixel.

8. The display panel according to claim 7, wherein for the first subpixel and the second subpixel which are adjacent in the second direction, a first segment in the first subpixel is away from a first metal line of the first subpixel, and a first segment in the second subpixel is away from a first metal line of the second subpixel; or a first segment in the first subpixel is adjacent to a first metal line of the first subpixel, and a first segment in the second subpixel is adjacent to a first metal line of the second subpixel.

9. The display panel according to claim 4, wherein at least one subpixel of the subpixels comprises at least two first segments and at least one second segment, or at least one subpixel of the subpixels comprises at least two second segments and at least one first segment.

10. The display panel according to claim 9, wherein the display panel comprises blue color resistors, red color resistors and green color resistors which are sequentially arranged in the first direction or the second direction, and a blue color resistor of the blue color resistors overlaps a subpixel comprising at least two first segments or at least two second segments in the third direction.

11. The display panel according to claim 4, wherein for two adjacent subpixels of the subpixels, one subpixel of the two adjacent subpixels comprises at least one first segment and at least one second segment, and the other subpixel of the two adjacent subpixels comprises one first segment or one second segment.

12. The display panel according to claim 11, wherein the display panel comprises blue color resistors, red color resistors and green color resistors which are sequentially arranged in the first direction or the second direction, and a green color resistor of the green color resistors overlaps a subpixel comprising one first segment or one second segment in the third direction.

13. The display panel according to claim 1, wherein in the first region, the first metal lines intersect the second metal lines to define subpixels, and a subpixel of the subpixels comprises a first electrode disposed in a same layer as the first metal lines, a second electrode and a third electrode which are disposed in a same layer as the second metal lines, and a semiconductor region; and in at least one subpixel of the subpixels, at least one of a first electrode or a semiconductor region at least partially overlaps a first segment of the third metal line in the first direction, and at least one of a second electrode, a third electrode, the semiconductor region or the first electrode at least partially overlaps a second segment of the third metal line in the second direction; and the third metal line comprises a third segment, one end of the third segment is connected to a first segment of the at least two first segments, and the other end of the third segment is connected to a second segment of the at least two second segments.

14. The display panel according to claim 13, wherein the third segment comprises a first section and a second section, one end of the first section is connected to the second segment, the other end of the first section is connected to the second section, and one end of the second section away from the first section is connected to the first segment; and a connecting line between two ends of at least one of the first section or the second section intersects with the first direction and the second direction, respectively.

15. The display panel according to claim 1, wherein the third metal lines are disposed in the first metal layer, one third metal line of the third metal lines is disposed between two adjacent first metal lines of the first metal lines; or the third metal lines are disposed in the second metal layer, and one third metal layer of the third metal lines is disposed between two adjacent second metal lines of the second metal lines.

16. The display panel according to claim 1, wherein a third metal line of the third metal lines is disposed between two first metal lines of the first metal lines, and for subpixels arranged in the first direction, a third metal line is disposed adjacent to one of two first metal lines; or a third metal line of the third metal lines is disposed between two second metal lines of the second metal lines, and for subpixels arranged in the second direction, a third metal line is disposed close to one of two second metal lines.

17. The display panel according to claim 1, A display panel, comprising a base material, a first metal layer and a second metal layer; wherein the first metal layer and the second metal layer are laminated on the base material in a thickness direction of the display panel, the first metal layer comprises first metal lines, the second metal layer comprises second metal lines, the first metal lines extend in a first direction, and the second metal lines extend in a second direction; the display panel further comprises a first region and a second region surrounding the first region, and in the first region, the first direction intersects the second direction;

at least one of the first metal layer of the second metal layer comprises third metal lines, a third metal line of the third metal lines comprises at least two first segments extending in the first direction and at least two second segments extending in the second direction, and two adjacent first segments of the at least two first segments are connected by one second segment of the at least two second segments;

the display panel further comprises a light-shielding layer, the third metal lines and the light-shielding layer are laminated in the thickness direction of the display panel, and the light-shielding layer at least partially overlaps the third metal lines; and the display panel further comprises a heating control assembly, and the third metal lines are electrically connected to the heating control assembly;

wherein in the first region, the first metal lines intersect the second metal lines to define subpixels, and a subpixel of the subpixels comprises a first electrode disposed in a same layer as the first metal lines, a second electrode and a third electrode which are disposed in a same layer as the second metal lines, and a semiconductor region; and in at least one subpixel of the subpixels, at least one of a first electrode or a semiconductor region at least partially overlaps a first segment of the third metal line in the first direction; or in at least one subpixel of the subpixels, at least one of a second electrode, a third electrode, a semiconductor region or a first electrode at least partially overlaps a second segment of the third metal line in the second direction.

18. The display panel according to claim 17, wherein the third electrode comprises a first portion and a second portion, the first portion and the first electrode overlap in the third direction, the second portion and the first electrode are staggered in the third direction, and the first segment overlaps the second portion in the first direction.

19. The display panel according to claim 17, wherein the third electrode comprises a first portion and a second portion, the first portion and the first electrode overlap in the third direction, the second portion and the first electrode are staggered in the third direction, and a second segment overlaps the second portion in the second direction.

20. The display panel according to claim 17, wherein the third metal lines are disposed in the first metal layer, one third metal line of the third metal lines is disposed between two adjacent first metal lines of the first metal lines; or the third metal lines are disposed in the second metal layer, and one third metal layer of the third metal lines is disposed between two adjacent second metal lines of the second metal lines.

21. A display panel, comprising a base material, a first metal layer and a second metal layer: wherein the first metal layer and the second metal layer are laminated on the base material in a thickness direction of the display panel, the first metal layer comprises first metal lines, the second metal layer comprises second metal lines, the first metal lines extend in a first direction, and the second metal lines extend in a second direction; the display panel further comprises a first region and a second region surrounding the first region, and in the first region, the first direction intersects the second direction;

at least one of the first metal layer of the second metal layer comprises third metal lines, a third metal line of the third metal lines comprises at least two first segments extending in the first direction and at least two second segments extending in the second direction, and two adjacent first segments of the at least two first segments are connected by one second segment of the at least two second segments;

the display panel further comprises a light-shielding layer, the third metal lines and the light-shielding layer are laminated in the thickness direction of the display panel, and the light-shielding layer at least partially overlaps the third metal lines; and the display panel further comprises a heating control assembly, and the third metal lines are electrically connected to the heating control assembly;

wherein in the first region, the first metal lines intersect the second metal lines to define subpixels, and a subpixel of the subpixels comprises a first electrode disposed in a same layer as the first metal lines, a second electrode and a third electrode which are disposed in a same layer as the second metal lines and a semiconductor region;

the semiconductor region is disposed in a different layer from the second electrode and the third electrode, the semiconductor region comprises a first semiconductor block, a second semiconductor block and a third semiconductor block, the first semiconductor block overlaps the second electrode, the second semiconductor block overlaps the third electrode, and the third semiconductor block connects the first semiconductor block and the second semiconductor block; and the third metal line is disposed away from the third semiconductor block.

22. The display panel according to claim 21, wherein the third metal lines are disposed in the second metal layer, and in one subpixel of the subpixels, a second segment is disposed adjacent to a second metal line corresponding to the one subpixel, and a third electrode is disposed away from the second metal line corresponding to the one subpixel.

23. The display panel according to claim 22, wherein for two subpixels which are adjacent in the second direction, a third electrode in one subpixel of the two subpixels is disposed adjacent to one second metal line of the second metal lines, and a third electrode in the other subpixel of the two subpixels is disposed adjacent to another second metal line of the second metal lines.

* * * * *